(12) United States Patent
Li

(10) Patent No.: US 11,545,049 B2
(45) Date of Patent: Jan. 3, 2023

(54) PROVISION OF INSTRUCTIONS FOR DRIVER TRAINING

(71) Applicant: Pony AI Inc., Cayman Islands (KY)

(72) Inventor: Chenyue Li, San Francisco, CA (US)

(73) Assignee: Pony AI Inc., Grand Cayman (KY)

( * ) Notice: Subject to any disclaimer, the term of this patent is extended or adjusted under 35 U.S.C. 154(b) by 633 days.

(21) Appl. No.: 16/523,935

(22) Filed: Jul. 26, 2019

(65) Prior Publication Data

US 2020/0035124 A1    Jan. 30, 2020

Related U.S. Application Data

(60) Provisional application No. 62/712,076, filed on Jul. 30, 2018.

(51) Int. Cl.
*G09B 19/16* (2006.01)
*G05D 1/00* (2006.01)

(52) U.S. Cl.
CPC ........... *G09B 19/16* (2013.01); *G05D 1/0088* (2013.01); *G05D 2201/0213* (2013.01); *G09B 19/162* (2013.01); *G09B 19/165* (2013.01); *G09B 19/167* (2013.01)

(58) Field of Classification Search
CPC ...................................................... G09B 19/16
See application file for complete search history.

(56) References Cited

U.S. PATENT DOCUMENTS

| | | | |
|---|---|---|---|
| 6,227,862 B1 | 5/2001 | Harkness | |
| 6,679,702 B1 | 1/2004 | Rau | |
| 7,792,328 B2 | 9/2010 | Albertson et al. | |
| 9,086,297 B2 | 7/2015 | Haleem | |
| 10,556,600 B2 * | 2/2020 | James | G05D 1/0061 |
| 11,214,280 B2 * | 1/2022 | Myers | B60W 50/14 |
| 2020/0035124 A1 * | 1/2020 | Li | G09B 19/16 |

* cited by examiner

*Primary Examiner* — Michael A Berns
(74) *Attorney, Agent, or Firm* — Sheppard Mullin Richter & Hampton LLP

(57) ABSTRACT

Systems, methods, and non-transitory computer readable media may be configured to provide instructions for driver training. Environmental information and driving information for a vehicle may be obtained. The environmental information may characterize positions of objects in an environment of the vehicle. The driving information may characterize operations of the vehicle in the environment. A desired vehicle operation may be determined based on the environmental information and the driving information. An instruction may be provided to a driver of the vehicle based on the desired vehicle operation. The instruction may describe one or more operations to be taken by the driver to execute the desired vehicle operation.

15 Claims, 6 Drawing Sheets

PROVISION OF INSTRUCTIONS FOR DRIVER TRAINING

CROSS REFERENCE TO RELATED APPLICATIONS

This application claims the benefit of and priority to U.S. Provisional Patent Application No. 62/712,076 filed on Jul. 30, 2018, which is hereby incorporated by reference in its entirety.

FIELD OF THE INVENTION

This disclosure relates to approaches for providing instructions to train drivers of vehicles.

BACKGROUND

Under conventional approaches, a person who is proficient at driving may need to accompany another person or oversee another person's driving to teach the other person how to drive a vehicle. Such training of drivers may be restricted by the availability of persons who are proficient at driving. One person who is proficient at driving may be unable to adequately attend to the needs of multiple drivers at the same time. Additionally, driving instructions taught by a person may be inconsistent and may be costly to provide. Moreover, the type of skills that may be taught to a driver may be limited by the driving circumstances encountered by the driver.

SUMMARY

Various embodiments of the present disclosure may include systems, methods, and non-transitory computer readable media configured to obtain environmental information and driving information for a vehicle. The environmental information may characterize positions of objects in an environment of the vehicle. The driving information may characterize one or more operations of the vehicle in the environment. A desired vehicle operation may be determined based on the environmental information and the driving information. An instruction may be provided to a driver of the vehicle based on the desired vehicle operation. The instruction may describe one or more operations to be taken by the driver to execute the desired vehicle operation.

In some embodiments, the objects in the environment of the vehicle may include a road marker, a structure, a person, an animal, or another vehicle. In some embodiments, the objects in the environment of the vehicle may include one or more autonomous vehicles. The autonomous vehicle(s) may be controlled to create a training scenario for the driver of the vehicle. A goal of the training scenario may include execution of the desired vehicle operation by the driver.

In some embodiments, the environmental information may further characterize a dynamic condition of the environment.

In some embodiments, the desired vehicle operation may be determined further based on historical driving information. The historical driving information may characterize prior driving operations of the vehicle or other vehicles.

In some embodiments, the instruction may be provided to the driver by a display or a speaker of the vehicle.

In some embodiments, the vehicle may be controlled based on the desired vehicle operation. The vehicle may be controlled based on a non-conforming response of the driver to the provision of the instruction to the driver. The non-conforming response of the driver may not conform to the instruction.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
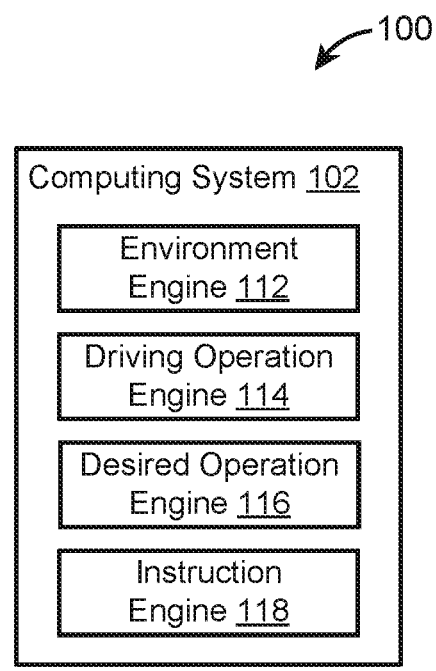
FIG. 1 illustrates an example environment for providing instructions for driver training, in accordance with various embodiments.

In various implementations, a computing system may obtain environmental information and driving information for a vehicle. The environmental information may characterize positions of objects, such as a road marker, a structure, a person, an animal, and/or another vehicle, in an environment of the vehicle. The driving information may characterize one or more operations of the vehicle in the environment. A desired vehicle operation may be determined based on the environmental information and the driving information. A desired vehicle operation may include a particular operation to be performed by a driver of the vehicle and/or the vehicle. An instruction may be provided (e.g., verbally and/or visually) to the driver of the vehicle based on the desired vehicle operation. The instruction may describe one or more operations to be taken by the driver to execute the desired vehicle operation.

The objects in the environment of the vehicle may include one or more autonomous vehicles. The autonomous vehicle(s) may be controlled to create a training scenario for the driver of the vehicle, where a goal of the training scenario includes execution of the desired vehicle operation by the driver. The autonomous vehicle(s) may be controlled to create different types of training scenarios and/or to create a series of training scenarios for the driver.

The environmental information may further characterize one or more dynamic conditions of the environment. For example, the environmental information may characterize weather conditions, lighting conditions, road conditions, traffic conditions, and/or other conditions of the environment that may change.

The desired vehicle operation may be determined further based on historical driving information. The historical driving information may characterize prior driving operations of the vehicle or other vehicles. The historical driving information may characterize prior driving operations of the current driver of vehicle while driving the same vehicle and/or different vehicle(s). The historical driving information may characterize prior driving operations of different driver(s) while driving the same vehicle and/or different vehicle(s).

The instruction may be provided to the driver by a display and/or a speaker of the vehicle. For example, the instruction may be provided to the driver by a display that is part of the vehicle, a display that is coupled to the vehicle, a speaker that is part of the vehicle, and/or a speaker that is coupled to the vehicle. The instruction may be provided to the driver by a display and/or a speaker that is worn by the driver.

The vehicle may be controlled based on the desired vehicle operation. For example, the vehicle may be controlled to execute the desired vehicle operation based on a non-conforming response of the driver to the provision of the instruction to the driver. The non-conforming response of the driver may not conform to the instruction. For example, the non-conforming response of the driver may include the driver ignoring the provided instruction and/or not following the provided instruction.

The approaches disclosed herein enables provision of an autonomous instructor for driver training. For instance, a vehicle/component of the vehicle may, based on the environment of the vehicle and the operation of the vehicle in the environment, provide one or more instructions to the driver of the vehicle to operate the vehicle in a particular way and thereby train the driver of a particular driving technique. Such provision of instructions for driver training may remove/reduce the need for human trainers, may provide consistent training for different drivers, and may lower the cost of training drivers. Such provision of instructions for driver training may also include creating customized scenarios to train drivers in various driving techniques.

While the disclosure is described herein with respect to drivers of vehicles on the road, this is merely for illustrative purposes and is not meant to be limiting. The approach disclosed herein may be used to provide instructions to train drivers of other vehicles (e.g., train, boat, ship, submarine, airplane, remote-controlled vehicle) or to train drivers in other locations (e.g., off the road, on a driving track, in the air, in the water).

FIG. 1 illustrates an example environment 100 for providing instructions for driver training, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution.

In various embodiments, the computing system 102 may include an environment engine 112, a driving operation engine 114, a desired operation engine 116, an instruction engine 118, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices. One or more portions of the computing system 102 may be implemented within a vehicle (e.g., autonomous vehicle). One or more portions of the computing system may be implemented remotely from a vehicle (e.g., server).

In various embodiments, the environment engine 112 may be configured to obtain environmental information for a vehicle. Obtaining environmental information may include accessing, acquiring, analyzing, determining, examining, identifying, loading, locating, opening, receiving, retrieving, reviewing, storing, and/or otherwise obtaining the environmental information. Environmental information may be obtained from hardware and/or software. Environmental information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Environmental information may be stored within a single file or across multiple files.

Environmental information for a vehicle may refer to information that describes an environment of the vehicle. An environment of a vehicle may refer to physical areas of the vehicle, such as one or more portions of surroundings of the vehicle and/or one or more portions of areas inside the vehicle. Environment information may describe the environment of the vehicle by describing one or more conditions of the environment. For example, the environmental information may characterize positions of one or more objects in the environment of the vehicle. Objects in an environment of a vehicle may refer to living things and/or non-living things in the surroundings of the vehicle and/or areas inside the vehicle, such as a road marker (e.g., two dimensional and/or three-dimensional markings on the road), a structure (e.g., building, tree, mailbox, light pole, traffic light, road sign), a person, an animal, another vehicle, and/or other objects in the environment of the vehicle. The environment information characterizing a position of an object in the environment of the vehicle may include the environment information providing information on the location of the object with respect to the vehicle, such as the distance (e.g., lateral distance, vertical distance) between the object and the vehicle, the angle at which the object is located from the vehicle, the direction in which the object is facing with respect to the vehicle, movement (e.g., translational movement, rotational movement) of the object with respect to the vehicle, and/or other information relating to the location of the object.

The environment information may characterize other characteristics of the object(s) in the environment, such as operating status of the object(s) and/or how the object(s) are acting. For example, the environment information may provide information on how a nearby vehicle is operating, the status of a nearby traffic light (e.g., green, yellow, red, flashing yellow), how a person inside the vehicle (e.g., driver, passenger) is acting, and/or other information relating to the object.

The environmental information may characterize one or more static conditions and/or one or more dynamic conditions of the environment. A static condition of an environment may refer to a condition of the environment that does not change over time, does not over a certain duration of time, and/or is not expected to change over time/a certain duration of time. For example, a static condition of an environment may refer to how roads are arranged within the environment, inclination of roads within the environment, characteristics of terrain within the environment, where/how a structure is located within the environment, and/or other information relating to the environment that does not change. A dynamic condition of an environment may refer to a condition of the environment that changes over time, changes over a certain duration of time, and/or is expected to change over time/a certain duration of time. For example, a dynamic condition of an environment may include a weather condition, a lighting condition, a road condition, a traffic condition, and/or other conditions of the environment that may change.

In some embodiments, one or more objects in the environment of the vehicle may include one or more autonomous vehicles. An autonomous vehicle may refer to a vehicle that is capable of navigating within an environment without human input. An autonomous vehicle may be fully autonomous or partially autonomous. In some embodiments, one or more autonomous vehicles in the environment of the vehicle may be controlled to create a training scenario for the driver of the vehicle. A training scenario may refer to a setting or a situation in which a driver of a vehicle may be trained on one or more operations of the vehicle. A goal of a training scenario may include execution of one or more desired vehicle operations by the driver of the vehicle. For example, one or more autonomous vehicles in the environment may be controlled to create a training scenario for a driver of the vehicle to practice safety measures (e.g., increasing distance to a vehicle that is being driven erratically), practice certain driving techniques (e.g., changing lanes, parking), and/or practice other operations relating to the vehicle. In some embodiments, the autonomous vehicle(s) may be controlled to create different types of training scenarios and/or to create a series of training scenarios for the driver. For example, the autonomous vehicle(s) may be controlled to put the driver of the vehicle through a number of different scenarios that may be encored on the road and/or to change the difficulty of certain types of scenarios (e.g., for changing lanes, decreasing the amount of space between cars). Other driver training scenarios are contemplated.

In some embodiments, information may be exchanged among one or more objects in the environment to facilitating driver training. For example, an environment of a vehicle may include other vehicle, which is an autonomous vehicle. The environmental information generated by the vehicle (e.g., sensor(s) of the vehicle) and/or the driving information for the vehicle may be provided to a computing device (e.g., a server, the computing system 102, the other vehicle) so that the other vehicle in the environment may (preemptively) take safety measures and/or create one or more training scenarios. The vehicle and/or the computing system 102 may receive information from the object(s) in the environment (such as the other car) to determine what safety measures the vehicle may/must take. For instance, a training scenario may include the other vehicle in the environment making an unexpected/strange turn in front of the vehicle to train the driver of the vehicle on responding to such turns. The vehicle of the driver may prepare for a sharp stop (without letting the driver know) in the event that the driver of the vehicle fails to appropriately respond to the unexpected/strange turn (e.g., failing to slow down/stop, failing to change heading of the vehicle).

In some embodiments, environmental information for a vehicle may be generated by one or more sensors and the environment engine 112 may retrieve the environmental information from the sensor(s), the electronic storage of the sensor(s), and/or one or more devices coupled to the sensor (s). A sensor may refer to a device that detects or measures one or more properties (e.g., physical properties) of an environment of the sensor and/or one or more devices coupled to the sensor. A sensor may detect certain events and/or changes in the environment of the sensor and/or one or more devices coupled to the sensor. For example, a sensor may include one or more of an image sensor, an audio sensor, a temperature sensor, a humidity sensor, a weather sensor, a vehicle speed sensor, a wheel speed sensor, a proximity sensor, a pressure sensor, a seat belt sensor, an accelerometer, a tilt sensor, an inclination sensor, an angular rate sensor, a gyroscope, an inertial measurement unit, a LIDAR sensor, a location sensor, a motion sensor, a magnetometer, a radar detector, a radar sensor, a vibration sensor, a light detection sensor, an engine control unit sensor, a physiological sensors, and/or other sensors. A sensor may be part of a vehicle, may be mechanically, electrically, and/or communicatively coupled to the vehicle, and/or may be remote from the vehicle. A sensor may be position within a vehicle and/or positioned outside the vehicle. A sensor may or may not be attached to a person (e.g., driver) within a vehicle. For example, environmental information for a vehicle may be generated by a sensor carried by the vehicle, such as a camera and/or a LIDAR sensor, that determines positions of objects around the vehicle and/or within the vehicle. Environmental information for a vehicle may be generated by a sensor carried by another vehicle in the environment. Environmental information for a vehicle may be generated by a sensor positioned in the environment of the vehicle, such as a weather sensor in a particular location. Environmental information for a vehicle may be generated by a sensor carried by a driver of the vehicle, such as a heartrate sensor carried by the driver.

In various embodiments, the driving operation engine 114 may be configured to obtain driving information for a vehicle. Obtaining driving information may include accessing, acquiring, analyzing, determining, examining, identifying, loading, locating, opening, receiving, retrieving, reviewing, storing, and/or otherwise obtaining the driving information. Driving information may be obtained from hardware and/or software. Driving information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Driving information may be stored within a single file or across multiple files.

Driving information for a vehicle may refer to information that describes one or more operations of the vehicle. Driving information for a vehicle may describe current operation(s) of the vehicle. An operation of a vehicle may refer to usage of the vehicle by the driver, an action taken by the vehicle (based on driver input and/or external factors), and/or other conditions relating to the vehicle. For example, the driving information may characterize operations of the vehicle in the environment. The driving information characterizing operations of the vehicle in the environment may include the driving information providing information on how the vehicle is being driven by the driver (e.g., speed, direction, destination, heading), how the vehicle operation is being impacted by one or more conditions of the environment (e.g., traffic condition, wind, rain, snow, hail, slippery road, flooding), the conditions and/or actions of the driver of the vehicle (e.g., focused on driving, distracted, alert, sleepy), the conditions and/or actions of one or more passengers of the vehicle, the load being carried by the vehicle, the operating status of the vehicle, and/or other information relating to the operation of the vehicle.

In some embodiments, driving information for a vehicle may be generated by one or more sensors and the operation engine 112 may retrieve the driving information from the sensor(s), the electronic storage of the sensor(s), and/or one or more devices coupled to the sensor(s). For example, one or more sensors of the vehicle and/or sensors in the environment of the vehicle may determine the speed and/or direction of the vehicle. One or more sensors of the vehicle and/or sensors carried by person(s) within the vehicle may determine the status of person(s) within the vehicle.

In various embodiments, the desired operation engine 116 may be configured to determine one or more desired vehicle operations based on the environmental information, the driving information, and/or other information. A desired vehicle operation may refer to a desired usage of the vehicle, a desired action by the vehicle, and/or other desired conditions relating to the vehicle. A desired vehicle operation may include a particular operation to be performed by a driver of the vehicle. A desired vehicle operation may directly or indirectly impact the operation of the vehicle. For example, a desired vehicle operation may include a particular driving maneuver to be performed by the driver of the vehicle (e.g., changing lanes) and/or a particular way in which the driver is to act within the vehicle (e.g., checking blind spots before changing lanes). The desired operation engine 116 may determine one of more desired vehicle operation by taking into account the environment of the vehicle, the operation of the vehicle, and/or other information. For example, the desired operation engine 116 may determine a particular desired vehicle operation based on the environmental information indicating particular relative position/orientation/motion of the vehicle with respect to one or more objects in the environment, the environment information indicating particular terrain within the environment, the environment information indicating particular road/weather condition, the driving information indicating a particular usage of the vehicle in the environment, and/or other information. Other determinations of desired vehicle operations are contemplated.

In some embodiments, the desired vehicle operation may be determined further based on historical driving information. Historical driving information may refer to information that describe one or more past operations of the vehicle and/or other vehicle. A past operation of a vehicle may refer to past usage of the vehicle by a driver, a past action taken by the vehicle (based on driver input and/or external factors), and/or other past conditions relating to the vehicle. For example, the historical driving information may characterize prior driving operations of the vehicle and/or other vehicles. The historical driving information may characterize prior driving operations of the current driver of vehicle while driving the same vehicle and/or different vehicle(s). The historical driving information may characterize prior driving operations of different driver(s) while driving the same vehicle and/or different vehicle(s). The historical driving information provide a drive history log that may be used to determine the desired vehicle operation and guide the driver. For example, based on the historical driving information, the desired operation engine 116 may determine that the current driver is driving too fast or too slow based on traffic/weather condition. As another example, based on the historical driving information, the desired operation engine 116 may determine that the current driver is driving too close to other vehicles given the load of the vehicle. Other usage of historical driving information for determinations of desired vehicle operations are contemplated.

In some embodiments, a desired vehicle operation may be performed by the vehicle. The desired vehicle operation may be performed by the vehicle based on the driver's control of the vehicle. For example, based on the driver of the vehicle not performing the desired vehicle operation (e.g., within a given amount of time, within a certain driving distance), the vehicle may perform the desired vehicle operation. For instance, if the desired vehicle operation is to increase the distance between the vehicle and another vehicle on the road, and the driver fails to operate the vehicle to increase the distance (e.g., within a certain amount of time, while driving a certain distance, by decreasing the distance), the vehicle itself may increase the distance.

In various embodiments, the instruction engine 118 may be configured to provide one or more instructions to a driver of the vehicle based on the desired vehicle operation(s) and/or other information. An instruction may refer to information that provides details relating to a desired vehicle operation. An instruction may describe one or more operations to be taken by the driver to execute the desired vehicle operation. For example, an instruction may identify a desired vehicle operation to be performed by the driver (e.g., "move to left lane") and/or may provide information on how the desired vehicle operation is to be performed (e.g., "turn on left turn signal, check the left mirror, check your blind spot, move to left lane if safe").

The instruction engine 118 may provide an instruction to a driver of the vehicle visually, verbally, and/or through other communication medium. For example, the instruction may be provided to the driver by one or more displays or one or more speakers of the vehicle. For example, the instruction may be provided to the driver by a display that is part of the vehicle, a display that is coupled to the vehicle, a speaker that is part of the vehicle, and/or a speaker that is coupled to the vehicle. The instruction may be provided to the driver by one or more displays and/or one or more speakers that is worn by the driver. Other provision of instructions are contemplated.

In some embodiments, the vehicle may be controlled based on the desired vehicle operation. For example, the vehicle may include an autonomous vehicle and the vehicle may be controlled by the autonomous driving hardware and/or software of the vehicle to execute the desired vehicle operation (rather than by the driver). The vehicle may be controlled (e.g., by the autonomous driving hardware and/or software) based on a non-conforming response of the driver to the provision of the instruction to the driver. A non-conforming response of the driver may refer to a response (action taken by the driver after the provision of the instruction) that not conform to the instruction. For example, a non-conforming response of the driver may include the driver ignoring the provided instruction and/or not following the provided instruction. A non-conforming response of the driver may be detected based on one or more sensor readings (e.g., image sensor, motion sensor, physiological sensor). Based on the driver of the vehicle not performing the desired vehicle operation (e.g., within a given amount of time, within a certain driving distance), the vehicle may be controlled by the autonomous driving hardware and/or software to perform the desired vehicle operation. For instance, if the desired vehicle operation is to increase the distance between the vehicle and another vehicle on the road, and the driver fails to operate the vehicle to increase the distance (e.g., within a certain amount of time, while driving a certain distance, by decreasing the distance), the vehicle may be controlled by the autonomous driving hardware and/or software to increase the distance. Or, if the desired vehicle operation is to drive within the speed limit, and the driver fails to operate the vehicle under the speed limit, the vehicle may be controlled by the autonomous driving hardware and/or software to drive within the speed limit.

As another example, the vehicle may be controlled by the autonomous driving hardware and/or software of the vehicle to prevent execution of particular vehicle operation(s). For instance, the desired vehicle operation may include changing the lane on which the vehicle is driving. Based on the driver response including an unsafe lane change maneuver (non-conforming response), such as attempting to change lanes without checking blind spot(s), the vehicle may be controlled by the autonomous driving hardware and/or software to prevent the driver from making the lane change.

In some embodiments, instruction engine 118 may provide one or more follow-up instructions the driver of the vehicle. A follow-up instruction may refer to information that provides details relating to operation of the vehicle after the original instruction has been provided. A follow-up instruction may be provided based on a non-conforming response of the driver. A follow-up instruction may describe one or more corrective operations to be taken by the driver to execute the desired vehicle operation. A corrective operation may refer to an operation that compensates for a non-conforming response of the driver. For instance, the desired vehicle operation may include changing the lane on which the vehicle is driving. Based on the driver response including an unsafe lane change maneuver (non-conforming response), such as attempting to change lanes without checking blind spot(s), the instruction engine 118 may provide a follow-up instruction (e.g., warning) to the driver to check the blind spot(s) before changing lanes. In some embodiments, the instruction engine 118 may provide one or more follow-up instructions the driver of the vehicle after the driver performs an undesired vehicle operation. For example, based on the driver making an unsafe lane change maneuver, the instruction engine 118 may inform the driver that an unsafe lane change maneuver was made and/or to check the blind spot(s) before making a lane change.

In some embodiments, the instruction engine 118 may change the way in which an instruction is provided to the driver. For example, the instruction engine 118 may change the way in which an instruction is provided to the driver based on how the driver responded to prior instruction(s). For instance, based on the driver repeatedly ignoring instructions to check blind spot(s) before changing lanes, the instruction engine 118 may increase the force with which the instruction is provided, such as by displaying the instruction in larger font, more noticeable font (e.g., red color), and/or other more visually noticeable way (e.g., flashing instructions), increasing the sound by which the instruction is verbally played, adding warning noises to the instructions, increasing the obtrusiveness of the instruction provision and/or other ways. In some embodiments, the instruction engine 118 may change other operations relating to the vehicle based on the driver's non-conforming response to provided instructions, such as by disabling music/video being played in the vehicle.

Figure 2:
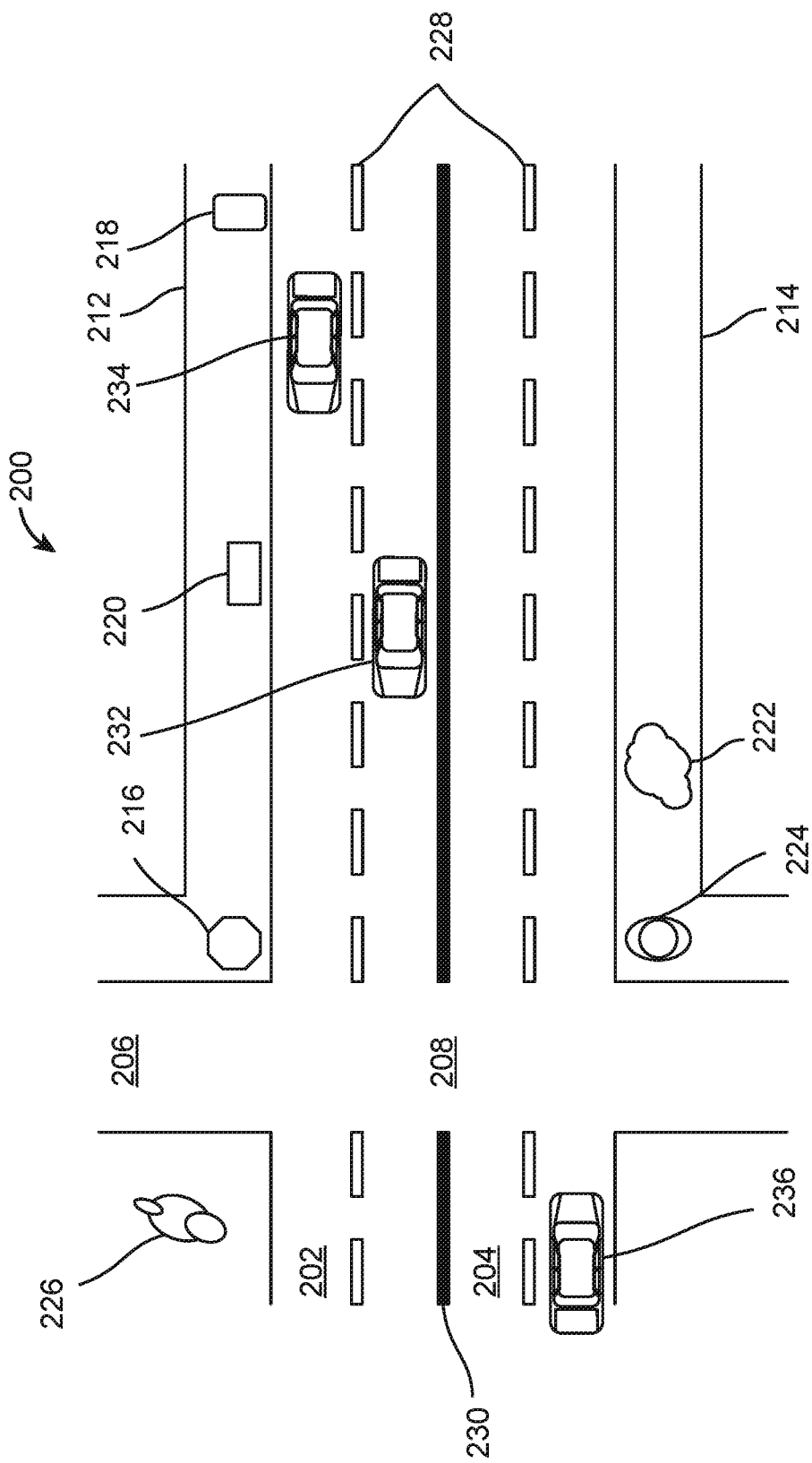
FIG. 2 illustrates an example scenario for driver training, in accordance with various embodiments.

FIG. 2 illustrates an example scenario 200 for driver training, in accordance with various embodiments of the present disclosure. The scenario 200 may include roads 202, 204, 206, with the roads 202, 204 intersecting with the road 206 at an intersection 208. A sidewalk 212 may be located on one side of the road 202 and a sidewalk 214 may be located on one side of the road 204. A stop sign 216, a light pole 218, and a mail box 220 may be affixed to the ground on or near the sidewalk 212. A tree 224 may be affixed to the ground on or near the sidewalk 214. A person 224 may be standing on the sidewalk 214, near the intersection 208. A dog 226 may be located on the other side of the road 206, opposite the sidewalk 212. The roads 202, 204 may include road markers 228 that divide the roads 202, 204 into different lanes. A road marker 230 may separate the roads 202, 204. The marker 230 may be a two-dimensional marker or a three-dimensional marker (e.g., barrier). Vehicles 232, 234 may be on the road 202, and a vehicle 236 may be on the road 204.

One or more drivers of the vehicles 232, 234, 236 may be provided (e.g., verbally, visually) with one or more instructions describing one or more operations to be taken by the driver(s) to executed one or more desired vehicle operations. For instance, based on the environment of the vehicle 232 and the operation of the vehicle 232, a desired vehicle operation for the vehicle 232 may be determined and provided to the driver of the vehicle 232. For example, based on positions of one or more of the road 202, the road 206, the intersection 208, the vehicle 234, the road marker 228, the stop sign 216, and/or other objects in the environment of the vehicle 232, a desired vehicle operation for the vehicle 232 may be determined to include making a right turn onto the road 206 at the intersection 208. An instruction describing the desired vehicle operation may be provided to the driver of the vehicle 232. For example, the instruction may identify the desired vehicle operation as making a right turn onto the road 206 at the intersection 208. The instruction may include additional information relating to the desired vehicle operation. Such additional information may be determined based on one or more objects within the environment of the vehicle 232. For instance, based on the road marker 228, the instruction may include information on changing the vehicle 232 driving on the left lane of the road 202 to the right lane of the road 202. Based on the vehicle 234 on the right lane of the road 202, the instruction may include information on how to change lane, such as checking one or more blind spots before changing lanes and/or increasing the distance between the vehicle 232 and the vehicle 234 before changing lanes (e.g., by speeding up, by slowing down and allowing the vehicle 234 to pass the vehicle 232). Based on the stop sign 216, a warning may be provided to the driver of the vehicle 232 if the vehicle 232 is not fully stopped before entering the intersection 208. The person 224, the dog 226, and/or the vehicle 236 may be monitored to see if the right turn onto the road 206 by the vehicle 232 may pose danger to the vehicle 232 and/or other objects, and provide warning/instruction to the driver of the vehicle 232.

In some embodiments, the vehicle 232 may be controlled to executed the desired vehicle operation. For example, based on the driver of the vehicle 232 failing to slow down to allow the vehicle 234 to pass, the vehicle 232 may be automatically controlled to allow the vehicle 234 to pass before returning the control of the vehicle 232 to the driver to make the lane change. In some embodiments, the vehicle 232 may be controlled to prevent the execution of the desired vehicle operation. For example, based on the driver of the vehicle 232 failing to check the blind spot(s) before making a lane change, the vehicle 232 may be automatically controlled to prevent the vehicle 232 from making the lane change and thereby making the right turn onto the road 206.

Figure 3:
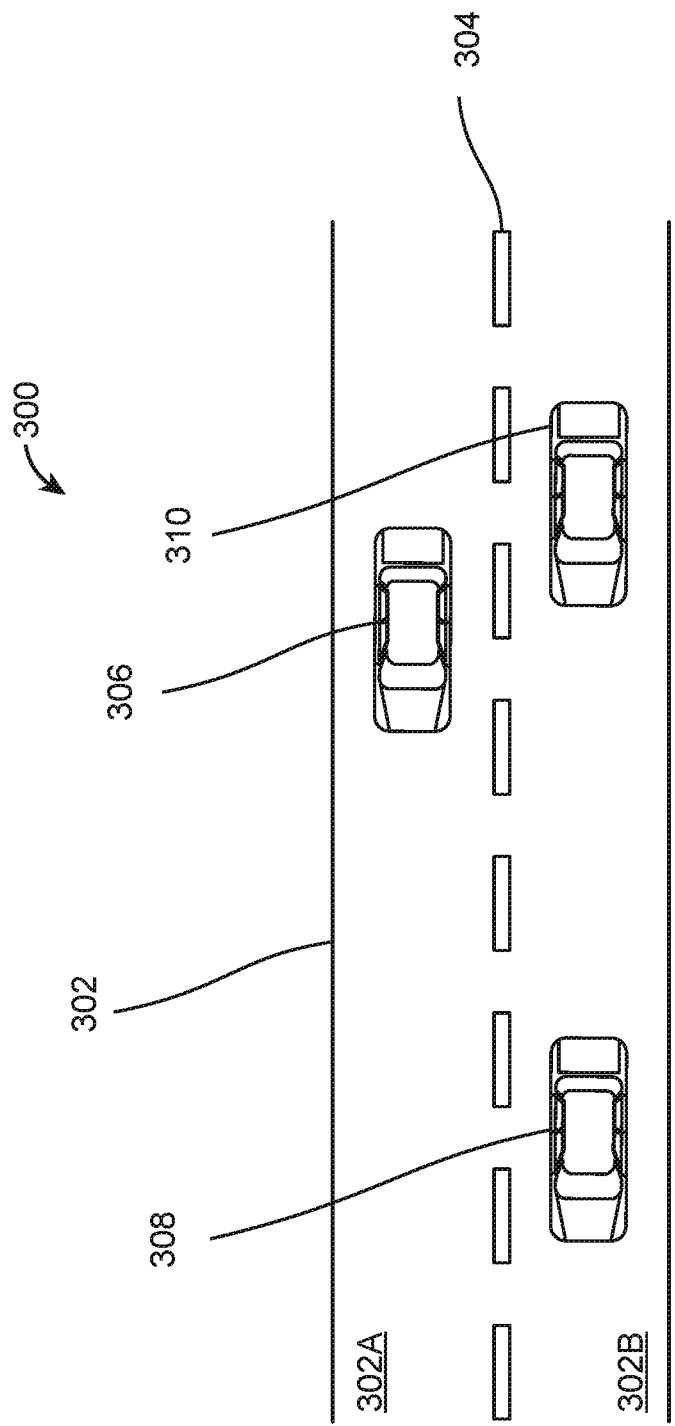
FIG. 3 illustrates an example scenario for driver training, in accordance with various embodiments.

FIG. 3 illustrates an example scenario 300 for driver training, in accordance with various embodiments of the present disclosure. The scenario 300 may include a road 302 with a lane 302A and a lane 302B. A road marker 304 may divide the road 302 into different lanes 302A, 302B. A vehicle 306 may be on the lane 302A. Vehicles 308, 310 may be on the lane 302B. The vehicles 308, 310 may include autonomous vehicles. The vehicles 308, 310 may controlled to create a training scenario for the driver of the vehicle 306. For example, the distance between the vehicle 308, 310 may be changed to provide different training scenarios into which the driver of the vehicle 306 is to make a lane change. Other types of training scenarios may be created based on control of one or more autonomous vehicles.

In some embodiments, one of more of the autonomous vehicles may be prepared to take safety measures based on operation of the vehicle 306 by the driver. For example, the driver of the vehicle 306 may not notice that the vehicle 310 is in the left lane 302B (e.g., by failing to check the blind spot of the vehicle 306) and may begin to change lanes. The vehicle 310 may receive information relating to the planned maneuver of the vehicle 306 to change lanes and may be prepared to slow down to allow the vehicle 306 into the lane 302B. Other preparations of autonomous vehicles for driving training are contemplated. Thus, use of one or more autonomous vehicles to create a training scenario may, in addition to generating custom training scenario(s) for driver (s), enable the driver(s) to training in a safer environment than among other types of vehicles as the autonomous vehicles may be prepared to respond to non-conforming response(s) of the driver(s) to provided instructions.

Figure 4:
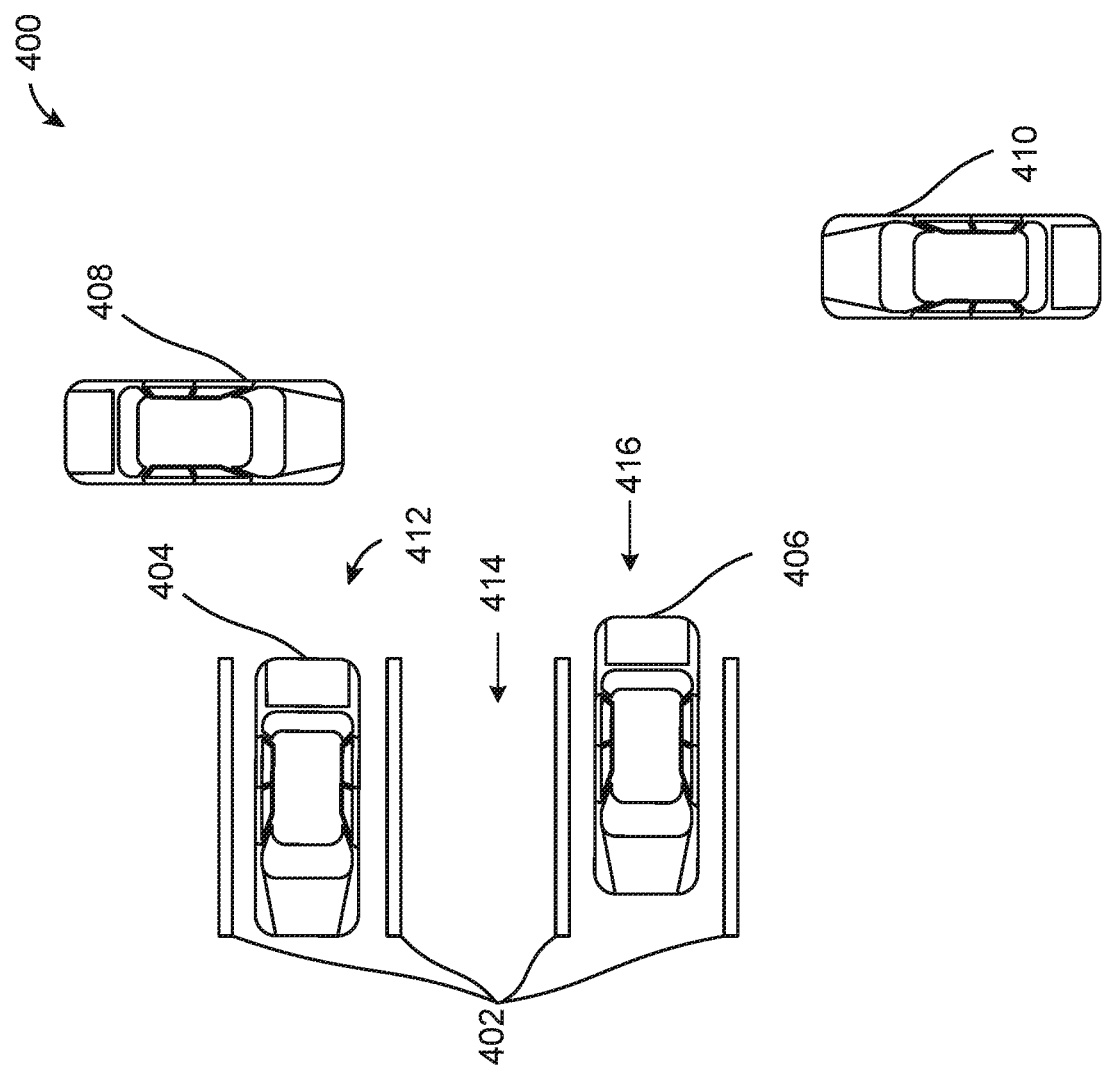
FIG. 4 illustrates an example scenario for driver training, in accordance with various embodiments.

FIG. 4 illustrates an example scenario 400 for driver training, in accordance with various embodiments of the present disclosure. The scenario 400 may include a parking lot including three parking spots 412, 414, 416 defined by road markers 402. A vehicle 404 may be occupying the parking spot 412. The parking spot 414 may be unoccupied. A vehicle 406 may be leaving the parking spot 416. Vehicles 408, 410 may be outside the parking spots 412, 414, 416. One or more drivers of the vehicles 404, 406, 408, 410 may be provided (e.g., verbally, visually) with one or more instructions describing one or more operations to be taken by the driver(s) to executed one or more desired vehicle operations. For instance, based on the environment of the vehicle 410 and the operation of the vehicle 410, a desired vehicle operation for the vehicle 410 may be determined and provided to the driver of the vehicle 410. For example, based on the parking spot 414 being open, the position of parking spot 414, and/or other objects in the environment of the vehicle 410, a desired vehicle operation for the vehicle 410 may be determined to include parking in to parking spot 414. An instruction describing the desired vehicle operation may be provided to the driver of the vehicle 410.

For example, the instruction may identify the desired vehicle operation as parking in the parking spot 414. The instruction may include additional information relating to the desired vehicle operation. Such additional information may be determined based on one or more objects within the environment of the vehicle 410. For instance, based on the vehicle 408, the instruction may include instruction on not pulling into the parking spot 414 in front of the vehicle 408, instruction on turning on the left turn signal to indicate to the driver of the vehicle 408 of the intention to park in the parking spot 414 and/or other instructions. Based on the vehicle 406 being in operation (e.g., moving out of the parking spot 416), the instruction may include information on waiting until the vehicle 406 is completely out of the parking spot 416 before moving into the parking spot 414. Based on the vehicle 406 backing out towards the vehicle 410, the instruction may include information on reversing the vehicle 410. The instruction may include additional information, such as information on checking the rear view mirror before reversing the vehicle 410 and/or a warning to check the rear view mirror if the driver starts reversing the vehicle 410 before checking the rear view mirror.

In some embodiments, the vehicle 410 may be automatically controlled to execute the desired vehicle operation. For example, based on the driver of the vehicle 410 failing to stop for the vehicle 406 to pull out of the parking spot 416, the vehicle 410 may be automatically controlled to stop and allow the driver of the vehicle 410 to complete the parking maneuver once it is safe to do so. As another example, based on the driver of the vehicle 410 failing to turn on the left turn signal, the vehicle 410 may automatically turn on the left turn signal and instruct the driver to be aware of other drivers/vehicles (e.g., the vehicle 408) in the environment.

In some embodiments, the vehicle 406 and/or the vehicle 408 may include autonomous vehicles, and may be prepared to take safety measures based on operation of the vehicle 410 by the driver and/or to create one or more training scenarios for the driver of the vehicle 410. For example, if the driver of the vehicle 410 does not notice the vehicle 406 pulling out of the parking spot 416 and/or proceeds to move into the parking spot 414 without regards for the vehicle 406, the vehicle 406 may be stopped to avoid colliding with the vehicle 410. As another example, the vehicle 408 may speed up to train the driver of the vehicle 410 how to respond when a vehicle may be traveling along path that intersects with the path of the vehicle 410. Other scenarios for driver training are contemplated.

Figure 5:
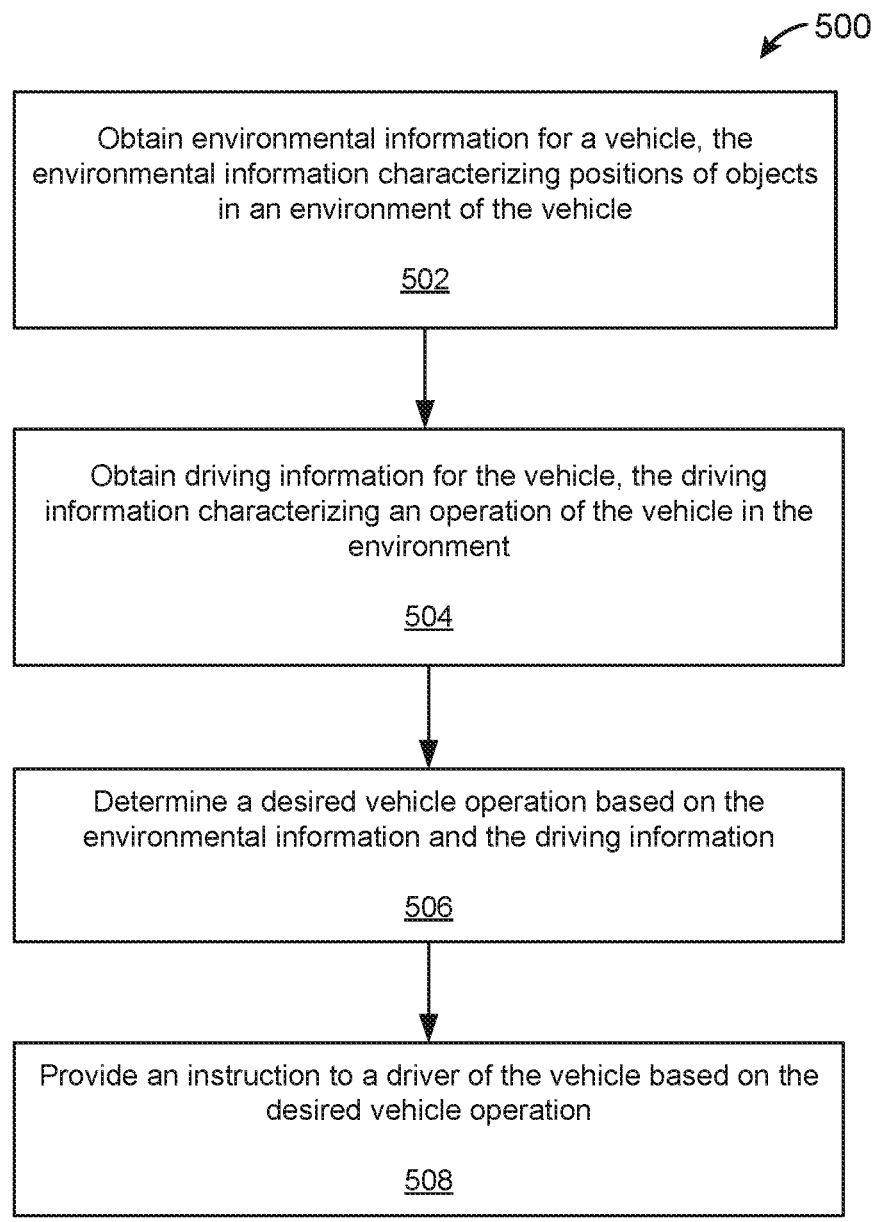
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, environmental information for a vehicle may be obtained. The environmental information may characterize positions of objects in an environment of the vehicle. At block 504, driving information for the vehicle may be obtained. The driving information may characterize an operation of the vehicle in the environment. At block 506, a desired vehicle operation may be determined based on the environmental information and the driving information. At block 508, an instruction may be provided to a driver of the vehicle based on the desired vehicle operation. The instruction may describe one or more operations to be taken by the driver to execute the desired vehicle operation.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
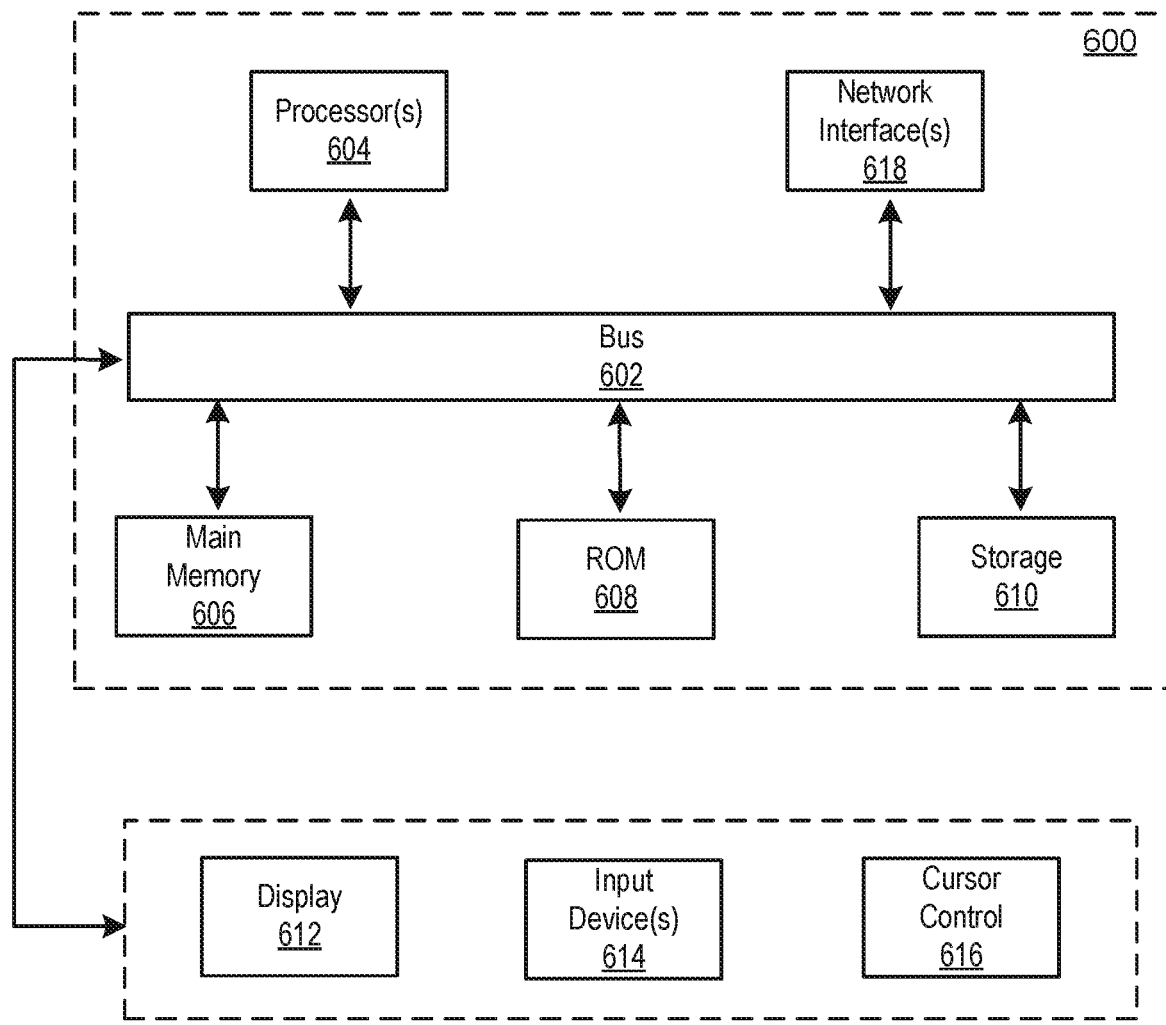
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
obtaining environmental information for a vehicle, the environmental information characterizing positions of objects in an environment of the vehicle, wherein the objects comprise one or more partially or fully autonomous vehicles;
obtaining driving information for the vehicle, the driving information characterizing an operation of the vehicle in the environment;
determining a desired vehicle operation based on the environmental information and the driving information; and
providing an instruction to a driver of the vehicle based on the desired vehicle operation, the instruction describing one or more operations to be taken by the driver to execute the desired vehicle operation, wherein the objects are controlled to create a training scenario for the driver of the vehicle, a goal of the training scenario including execution of the desired vehicle operation by the driver.

2. The system of claim 1, wherein the instruction is provided to the driver by a display or a speaker of the vehicle.

3. The system of claim 1, wherein the desired vehicle operation is determined further based on historical driving information, the historical driving information characterizing prior driving operations of the vehicle or other vehicles.

4. The system of claim 1, wherein the environmental information further characterizes a dynamic condition of the environment.

5. The system of claim 1, wherein the instructions, when executed by the one or more processors, further cause the system to perform controlling the vehicle based on the desired vehicle operation.

6. The system of claim 5, wherein the control of the vehicle by the system is performed further based on a non-conforming response of the driver to the provision of the instruction to the driver, the non-conforming response of the driver not conforming to the instruction.

7. The system of claim 1, wherein the objects include a road marker, a structure, a person, an animal, or another vehicle.

8. A method implemented by a computing system including one or more processors and storage media storing machine-readable instructions, wherein the method is performed using the one or more processors, the method comprising:
- obtaining environmental information for a vehicle, the environmental information characterizing positions of objects in an environment of the vehicle, wherein the objects comprise one or more partially or fully autonomous vehicles;
- obtaining driving information for the vehicle, the driving information characterizing an operation of the vehicle in the environment;
- determining a desired vehicle operation based on the environmental information and the driving information; and
- providing an instruction to a driver of the vehicle based on the desired vehicle operation, the instruction describing one or more operations to be taken by the driver to execute the desired vehicle operation, wherein the objects are controlled to create a training scenario for the driver of the vehicle, a goal of the training scenario including execution of the desired vehicle operation by the driver.

9. The method of claim 8, wherein the instruction is provided to the driver by a display or a speaker of the vehicle.

10. The method of claim 8, wherein the desired vehicle operation is determined further based on historical driving information, the historical driving information characterizing prior driving operations of the vehicle or other vehicles.

11. The method of claim 8, wherein the environmental information further characterizes a dynamic condition of the environment.

12. The method of claim 8, further comprising controlling the vehicle based on the desired vehicle operation.

13. The method of claim 12, wherein the controlling of the vehicle is further based on a non-conforming response of the driver to the provision of the instruction to the driver, the non-conforming response of the driver not conforming to the instruction.

14. The method of claim 8, wherein the objects include a road marker, a structure, a person, an animal, or another vehicle.

15. A non-transitory computer readable medium comprising instructions that, when executed, cause one or more processors to perform:
- obtaining environmental information for a vehicle, the environmental information characterizing positions of objects in an environment of the vehicle, wherein the objects comprise one or more partially or fully autonomous vehicles;
- obtaining driving information for the vehicle, the driving information characterizing an operation of the vehicle in the environment;
- determining a desired vehicle operation based on the environmental information and the driving information; and
- providing an instruction to a driver of the vehicle based on the desired vehicle operation, the instruction describing one or more operations to be taken by the driver to execute the desired vehicle operation, wherein the objects are controlled to create a training scenario for the driver of the vehicle, a goal of the training scenario including execution of the desired vehicle operation by the driver.

* * * * *